(12) United States Patent
Yamamoto

(10) Patent No.: US 6,301,024 B1
(45) Date of Patent: Oct. 9, 2001

(54) IMAGE READING DEVICE

(75) Inventor: Yasuhiro Yamamoto, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/205,201

(22) Filed: Dec. 4, 1998

(30) Foreign Application Priority Data

Dec. 5, 1997 (JP) .................................................... 9-352134

(51) Int. Cl.[7] .............................................. H04N 1/46
(52) U.S. Cl. .................................... 358/509; 358/510
(58) Field of Search ............................... 358/509, 504, 358/505, 506, 475, 406, 510, 513, 474, 443, 445

(56) References Cited

U.S. PATENT DOCUMENTS 4,812,912 * 3/1989 Iida et al. ............................. 348/346
5,485,209 * 1/1996 Muramoto et al. ................. 348/349

OTHER PUBLICATIONS

An English Language abstract of JP–8–167972.

* cited by examiner

Primary Examiner—Cheukfan Lee
(74) Attorney, Agent, or Firm—Greenblum & Bernstein, P.L.C.

(57) ABSTRACT

The image reading device has a light source, a collimator lens, a cylindrical lens and a line sensor. The light source is provided with light-emitting diodes radiating green, red and blue light beams, respectively. The light-emitting diodes are arranged on a straight line, which is perpendicular to the optical axis of the collimator lens and which intersects a focal point of the collimator lens. Each of the green, red and blue light beams is changed to a parallel beam by the collimator lens, and is then changed to a strip-shaped light beam by the cylindrical lens. The parallel beam passes through a film, and is radiated onto a line sensor. Out-of-register of the red, green and blue components generated on the line sensor are corrected by a calculation applied to pixel signals obtained by the line sensor.

17 Claims, 11 Drawing Sheets

IMAGE READING DEVICE

BACKGROUND OF THE INVENTION

1. Field of the Invention

The present invention relates to an image reading device by which an image signal, recorded in a recording medium, is sensed using a line sensor, for example.

2. Description of the Related Art

Conventionally, in an image reading device that senses the image by using an imaging device such as a line sensor, there are several ways to detect a focal position at which an image to be read is focused. For example, an image signal is read by the line sensor, and is subjected to a filtering process using a low pass filter, which passes signals derived when a focusing lens is not in an in-focus condition, so that a filtered image signal is obtained. The filtered image signal is subtracted from the original image signal, and the resultant image signal obtained by the subtraction is integrated, so that the contrast of the image is obtained. The focal position is detected in accordance with the contrast.

Thus, a complicated calculation is needed in the filtering process to detect the focal position. Further, when an image signal is processed, it should be taken into consideration that frequency characteristics of the image signal differ depending upon an object to be read. Furthermore, if the image signal contains noise, since the noise is integrated together with the image signal or a phase of light is inverted due to the limit of performance of the lens, the peak value of the contrast may not be calculated with a high accuracy.

SUMMARY OF THE INVENTION

Therefore, an object of the present invention is to provide an image reading device in which a complicated filtering process and an auto focusing control are not required, and which has a simple and miniaturized construction.

According to the present invention, there is provided an image reading device comprising a light source, an optical system, a line sensor, an out-of-register sensing processor and an out-of-register adjusting processor.

The light source radiates a plurality of light beams of differing color components. The optical system changes the plurality of light beams to a plurality of parallel beams, and leads the plurality of parallel beams to a recording medium. One of the plurality of parallel beams is parallel to an optical axis of the optical system. The remaining beam of the plurality of parallel beams is inclined to the optical axis. The line sensor senses the plurality of parallel beams passing through the recording medium, to generate at least first and second line image signals corresponding to an image recorded on the recording medium. The one of the plurality of parallel beams, which passes through a predetermined point on the recording medium, enters a first portion of a light receiving surface of the line sensor. The remaining beam of the plurality of parallel beams, which passes through the predetermined point, enters a second portion of the light receiving surface. The out-of-register sensing processor senses an amount of out-of-register, being a distance between the first and second portions. The out-of-register adjusting processor adjusts at least one of the first and second line image signals in such a manner that an effect of the amount of out-of-register on a color image reproduced from the first and second line image signals is reduced.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
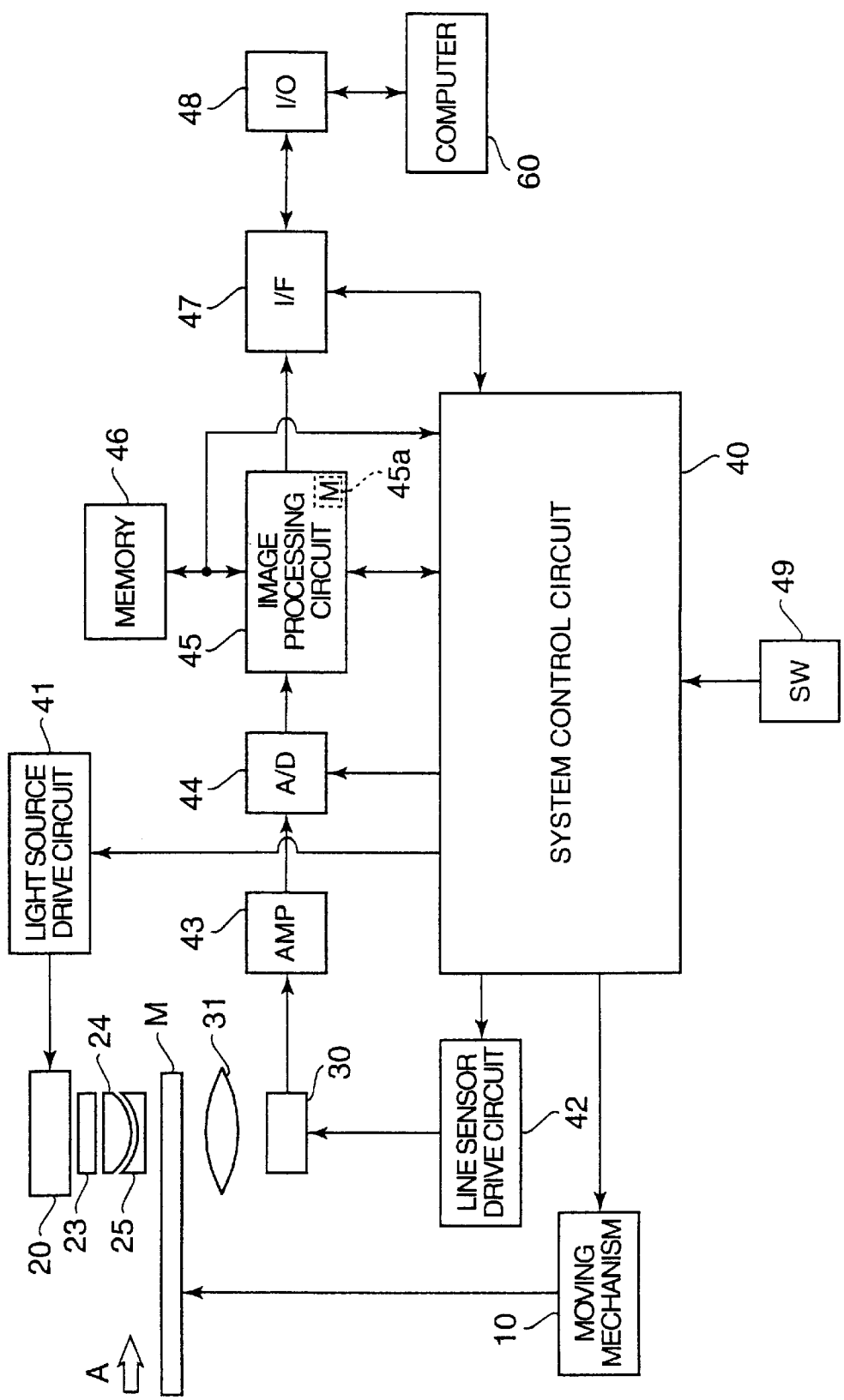
FIG. 1 is a block diagram showing a film scanner having an image reading device to which a first or second embodiment of the present invention is applied.

The present invention will be described below with reference to embodiments shown in the drawings.

FIG. 1 shows a block diagram of a film scanner having an image reading device to which a first or second embodiment of the present invention is applied. Namely, the block diagrams of the first and second embodiments are identical.

A read object M, handled by this image reading device, is a transparent positive film on which a color image has been recorded. The film M is intermittently moved, by a film moving mechanism 10, in a direction shown by an arrow A. A light source 20 is disposed above a path along which the film M is moved, and a collimator lens 23 and cylindrical lenses 24 and 25 are disposed between the light source 20 and the film M. A line sensor 30 and a forming lens 31 are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The film moving mechanism 10, the light source drive circuit 41 and the line sensor drive circuit 42 are controlled in accordance with a command signal outputted by a system control circuit 40.

A line sensor 30 is provided with a plurality of photodiodes, which are aligned rectilinearly, whereby an electric signal, corresponding to the amount of light received by the photo-diode, is generated in each of the photo-diodes. Each of the electric signals (i.e. the pixel signals), read from the line sensor 30, is amplified by an amplifier 43 and is converted to a digital signal by an A/D converter 44. The digital pixel signals form a line image signal, which corresponds to a line image sensed by the line sensor. The digital pixel signals are subjected to an image process, such as a shading correction, in an image processing circuit 45, and are then stored in a memory 46.

The digital pixel signals, subsequent to being read from the memory 46, are subjected to various correction processes, such as a color correction and a gamma correction. Then, the corrected digital pixel signals are transmitted to a buffer memory 45a provided in the image processing circuit 45, and are converted to a signal, which conforms to a predetermined format, by an interface circuit 47, before being outputted through an input/output terminal 48 to an external computer 60, which is provided outside the image reading device. The image processing circuit 45 and the interface circuit 47 are controlled by the system control circuit 40.

In these embodiments, although all of the operations can be controlled by the external computer 60, a switch 49 may be connected to the system control circuit 40, so that various operations can be directly performed, such as the image reading operation, for example.

Figure 2:
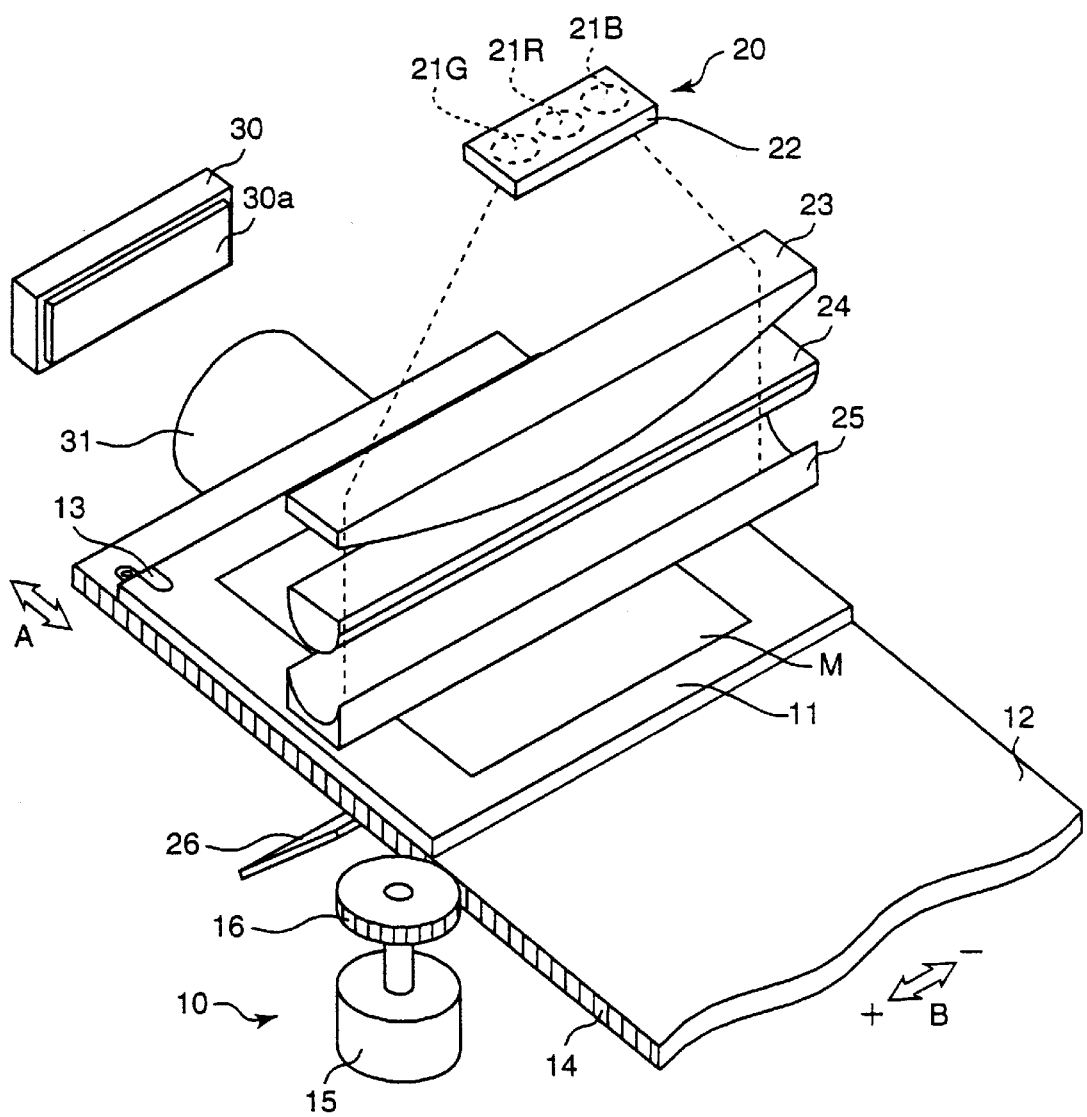
FIG. 2 is a perspective view showing a moving mechanism, a light source and a line sensor, when a transparent film is used.

FIG. 2 shows the moving mechanism 10, the light source 20 and the line sensor 30. The film M is supported by a frame 11, which is fixed on a stage 12 by a fastener 13. An opening (not shown) is formed in the stage 12 at a position corresponding to the film M, so that a light beam radiated onto the film M can pass through the film M. A rack 14 is formed on a side surface of the stage 12. A pinion 16, fixed on an output shaft of a feeding motor 15, is meshed with the rack 14. The feeding motor 15, which is a stepping motor, for example, is driven under control of the system control circuit 40, so that the position of the film M is controlled.

The light source 20, positioned above the stage 12, is provided with light-emitting diodes 21G, 21R and 21B, which radiate G(green), R(red) and B(blue) light beams, respectively. The light-emitting diodes 21G, 21R and 21B, supported by a slender support member 22, extending in a breadth direction (i.e. a direction of arrow B) of the stage 12, are arranged in this order along the support member 22. Namely, the light-emitting diodes 21G, 21R and 21B are arranged along a straight line, which passes through a focal point of the collimator lens 23 and is perpendicular to the optical axis thereof. The light-emitting diodes 21G, 21R and 21B are separately turned ON in a predetermined order.

The collimator lens 23 is disposed under the support member 22, and the cylindrical lenses 24 and 25 are positioned between the collimator lens 23 and the stage 12. The collimator lens 23 and the cylindrical lenses 24 and 25 are extended in parallel with the support member 22.

A mirror 26 is provided under the stage 12. The mirror 26 is extended in parallel with the collimator lens 23 and the cylindrical lenses 24 and 25. The mirror 26 is inclined to the stage 12 at approximately 45 degrees. The line sensor 30 is disposed below the level of the stage 12, in front of the mirror 26, and the forming lens 31 is disposed between the mirror 26 and the line sensor 30. The line sensor 30 is disposed approximately at a focal point of the forming lens 31, and is parallel to the straight line along which the light-emitting diodes 21G, 21R and 21B are arranged.

The light beams, radiated by the light-emitting diodes 21G, 21R and 21B, pass through the lenses 23, 24 and 25 and the film M, before being reflected by the mirror 26 to become incident on a light receiving surface 30a of the line sensor 30 through the forming lens 31. Thus, an image recorded on the film M is formed on the light receiving surface 30a of the line sensor 30.

Figure 3:
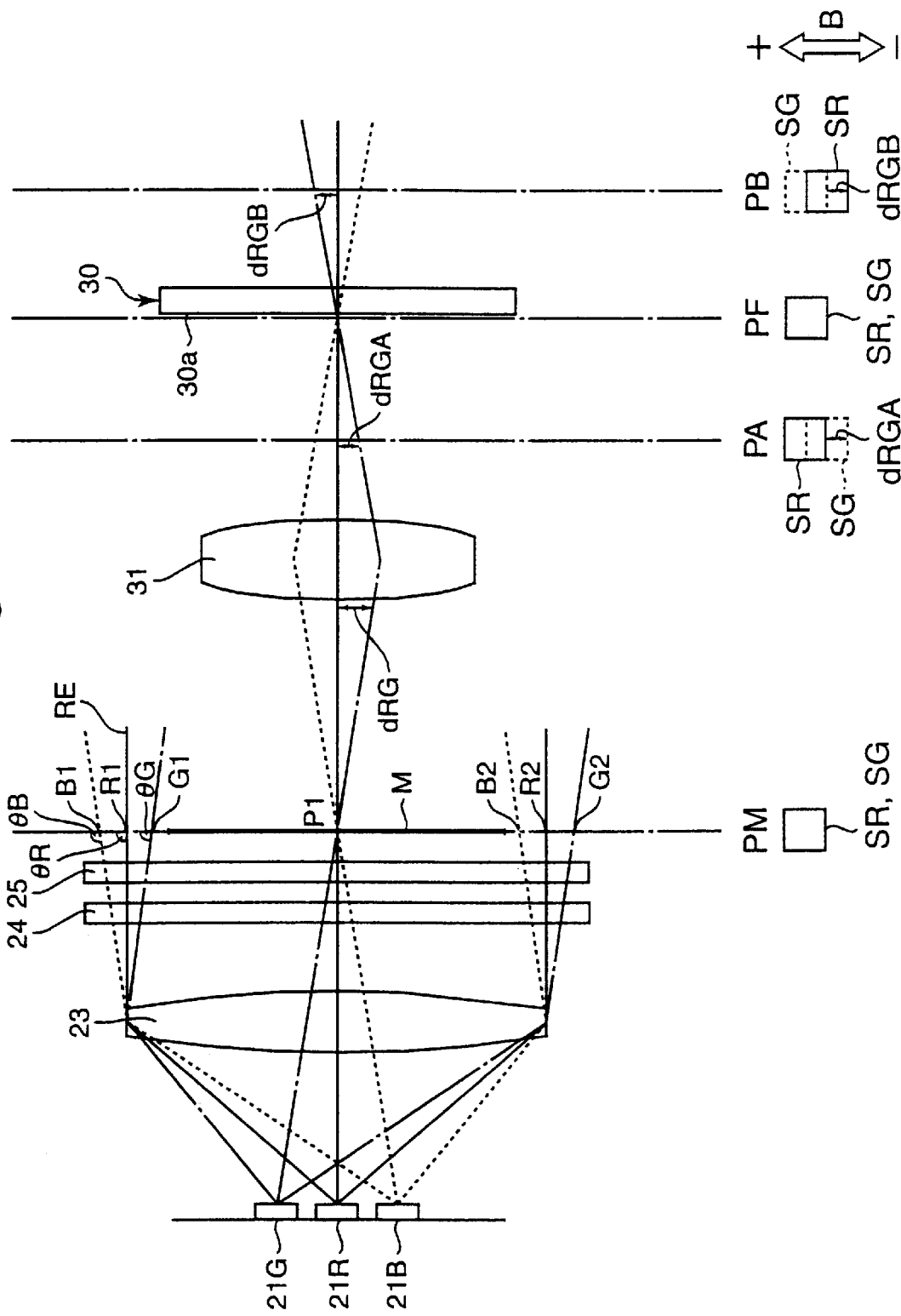
FIG. 3 is a view showing an illumination optical device, for explaining the principle of the first and second embodiments.

With reference to FIG. 3, an illumination optical device of the first and second embodiments and obtaining if an out-of-register value are described below. Note that FIG. 3 shows a schematic view of the illumination optical device, and shows optical paths of light beams emitted by the light-emitting elements 21G, 21R and 21B. The arrow B corresponds to the longitudinal direction of the line sensor 30, the upward direction being referred to as a positive direction and the downward direction being referred to as a negative direction, hereinafter.

Green, red and blue light beams, radiated from the light-emitting diodes 21R, 21G and 21B, are changed by the collimator lens 23 to parallel beams as shown in FIG. 3. The green, red and blue parallel beams are condensed by the cylindrical lenses 24 and 25 in a direction perpendicular to the plane of FIG. 3 in which the film M is moved, so that strip-shaped light beams, extending in a direction shown by the arrow B, are radiated onto the film M. Note that the cylindrical lens 24 condenses the light beams radiated by the collimator lens 23 in a direction in which the film M is moved, and the cylindrical lens 25 changes the light beams radiated by the collimator lens 23 to parallel beams.

Thus, on the film M, the green light beam illuminates a range between points G1 and G2, the red light beam illuminates a range between points R1 and R2, and the blue light beam illuminates a range between points B1 and B2. Since the light-emitting diode 21R is positioned between the light-emitting diodes 21G and 21B, the point R1 is positioned between the points B1 and G1, and the point R2 is positioned between the points B2 and G2. In other words, a portion between the points G1 and B2 is illuminated by each of the green, red and blue light beams. The film M is placed between the points G1 and B2, so that each of the green, red and blue light beams is incident on the film M, and thus, the light beams passing through the film M are sensed by the line sensor 30.

Among the light-emitting diodes 21G, 21R and 21B, the light-emitting diode 21R has the smallest size and is thus disposed at the center, i.e. symmetrically between the light-emitting diodes 21G and 21B, so that the light-emitting diodes 21G and 21B can be positioned as close to each other as possible. In other words, the light-emitting diodes 21G and 21B are positioned as close to the optical axis of the collimator lens 23 as possible. Further, the light-emitting diodes 21G and 21B are disposed at an equal distance from the light-emitting diode 21R. Note that the light-emitting diode 21G, which emits a green light beam having the greatest effect on the luminance, may be positioned at the optical axis.

Accordingly, when a light beam RE, radiated from the light-emitting diode 21R, passes through the film M and enters the line sensor 30 at an angle $\theta R$, which is approximately a right angle, light beams GE and BE radiated from the light-emitting diodes 21G and 21B, respectively, pass through the film M and enter the line sensor 30 at angles $\theta G$ and $\theta B$, which are close to right angles. Namely, the angles $\theta G$ and $\theta B$ are not right angles, with the angle $\theta B$ being greater than the angle $\theta R$, and the angle $\theta G$ being less than the angle $\theta R$.

A light beam passing through the film M enters the light receiving surface 30a of the line sensor 30 through the forming lens 31. Regarding the green and red light beams entering a portion P1 on a film surface PM on which the film M is placed, a spot SG, which is illuminated by the green light beam on the film surface PM, is at the same position as a spot SR, which is illuminated by the red light beam on the film surface PM. Since the light-emitting diodes 21G and 21R are disposed at different positions, the green light beam passing through the portion P1 enters the forming lens 31 at a position offset by an amount "dRG" in the negative direction from the red light beam. The green and red light beams are condensed by the forming lens 31, so that an optical image of the portion P1 is formed on the in-focus plane PF at a position optically conjugate to the portion P1 about the forming lens 31. Namely, at the in-focus plane PF, the green and red light beams enter the same spot, so that the green spot SG and the red spot SR are at the same position.

If the line sensor 30 were to be placed on a plane PA, which is closer to the forming lens 31 in comparison with the in-focus plane PF, the green light beam would enter the line sensor 30 at a position which is offset by an amount "dRGA" in the negative direction from the red light beam. Namely, the green spot SG would be offset by the amount "dRGA" in the negative direction from the red spot SR.

Conversely, if the line sensor 30 were to be placed on a plane PB, which is separated from the forming lens 31 in comparison with the in-focus plane PF, the green light beam would enter the line sensor 30 at a position which is offset by the amount "dRGB" in the positive direction from the red light beam. Namely, the green spot SG would be offset by the amount "dRGB" in the positive direction from the red spot SR.

Thus, when the line sensor 30 is offset from the in-focus plane PF, i.e. when the line sensor 30 is not set to the in-focus condition, out-of-register occurs in which the green spot SG is offset from the red spot SR. Out-of-register occurs only in a longitudinal direction of the line sensor 30, because the light-emitting diodes 21G, 21R and 21B are arranged in parallel to the longitudinal direction of the line sensor 30.

Figure 4:
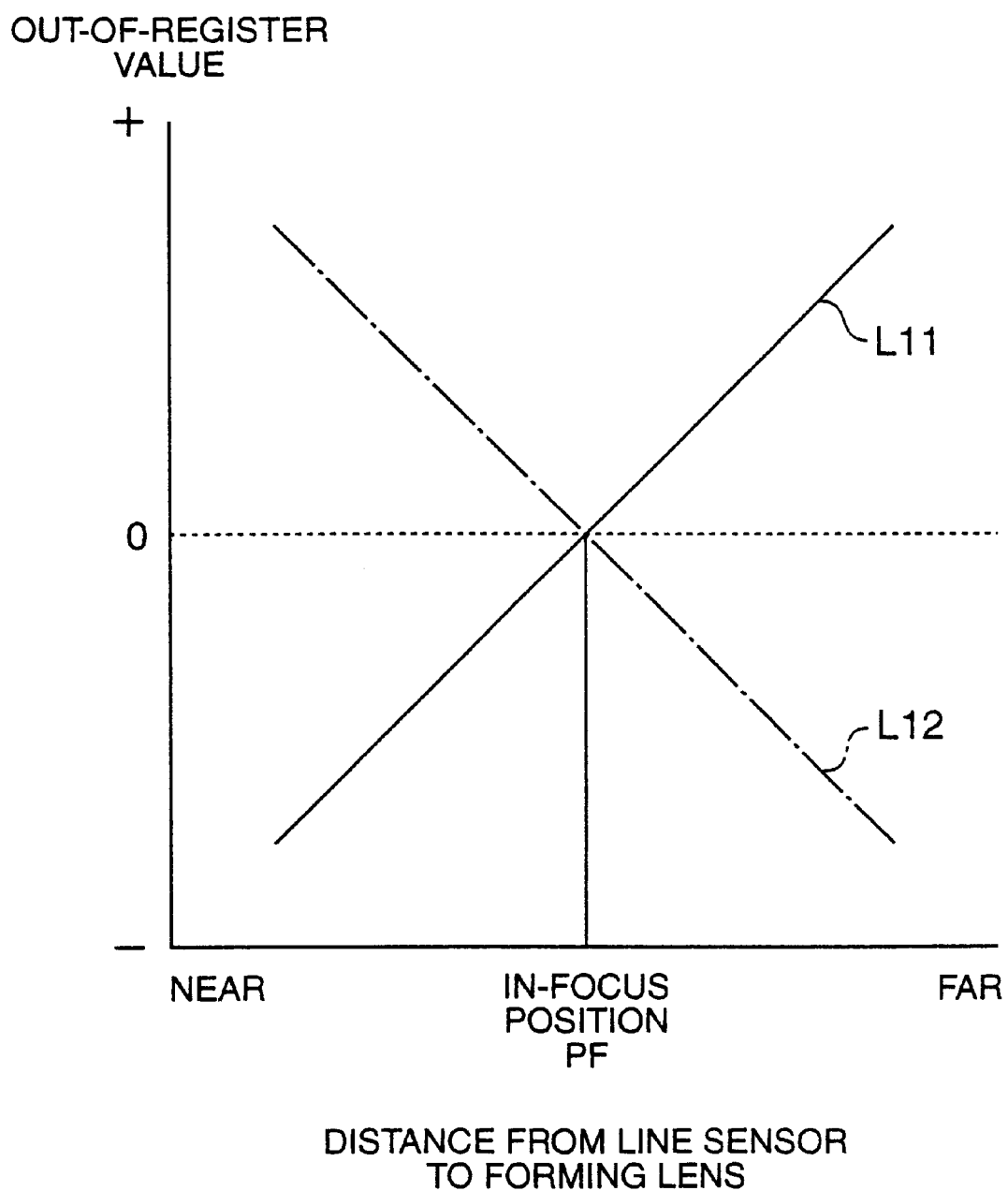
FIG. 4 is a view showing a relationship between an out-of-register value and a distance from a line sensor to a forming lens.

FIG. 4 shows a relationship between an out-of-register value and a distance from the line sensor 30 to the forming lens 31. Reference L11 indicates an out-of-register value of the green spot relative to the red spot. When the line sensor 30 is placed on the in-focus plane PF, out-of-register does not occur. Conversely, when the line sensor 30 is displaced towards the forming lens 31, relative to the in-focus plane PF, out-of-register occurs in the negative side, and when the line sensor 30 is displaced away from the forming lens 31, relative to the in-focus plane PF, out-of-register occurs in the positive side. Similarly, reference L12 indicates an out-of-register value of the blue spot relative to the red spot. Since the light-emitting diode 21B is placed at a position opposite to the light-emitting diode 21G about the light-emitting diode 21R, a direction of out-of-register of the blue spot is opposite to that of the green spot. Namely, the out-of-register value of the blue spot changes in accordance with the distance from the line sensor 30 to the forming lens 31, as shown by the line L12.

As described above, out-of-register occurs when the line sensor 30 is not placed on the in-focus plane PF. In the image reading device of the embodiment, however, since the line sensor 30 and the forming lens 31 are stationary, out-of-register occurs because of the offset of the film M along the optical axis of the forming lens 31. Thus, out-of-register occurs when the line sensor 30 and the portion P1 on the film M are not placed at conjugate positions about the forming lens 31. Namely, if the film M is offset from the conjugate position, the in-focus point of the line sensor 30 is offset, which is substantially the same state as that in which the line sensor 30 is placed at the planes PA or PB.

In the first and second embodiments, a process described below is performed in such a manner that an effect of out-of-register on a color image reproduced from the image signals obtained by the line sensor 30 is reduced.

Figure 5:
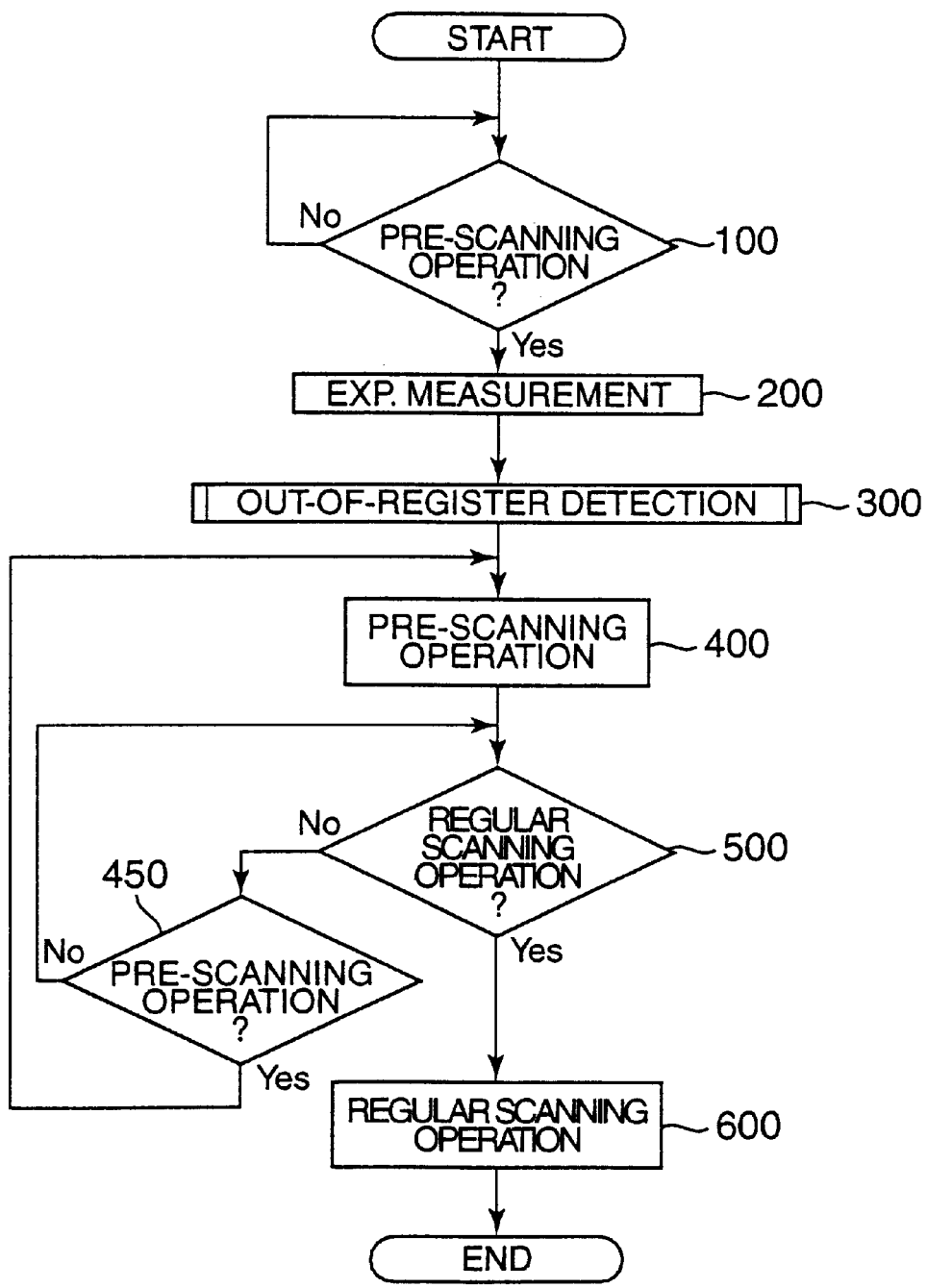
FIG. 5 is a flowchart of an image reading routine, executed in the image reading device, in which the out-of-register is sensed.

FIG. 5 is a flowchart of an image reading routine, which is executed by the system control circuit 40 of the image reading device, and in which out-of-register is detected.

In step 100, it is determined whether a pre-scanning operation is to be performed. When a predetermined label indicated on a surface of a display device connected to the computer 60 is clicked using a mouse, for example, the process goes from Step 100 to Step 200, so that an exposure measurement is carried out.

In the exposure measurement, while the light-emitting diodes 21G, 21R and 21G are turned ON in a predetermined order, the film M is intermittently moved, via the film moving mechanism 10, with a pitch which is coarser than that of a regular scanning operation performed in Step 600. During the intermittent movement, the line sensor 30 is exposed for a predetermined exposure time, so that pixel signals of one frame image are detected. Thus, in the exposure measurement, the light source 20 is controlled in such a manner that the light-emitting diodes 21G, 21R and 21B are illuminated in a predetermined order every time the stage 12 is stopped, so that R, G and B pixel signals are obtained. In the exposure measurement, based on the output signal (i.e. the pixel signal) of the line sensor 30, an optimum exposure time is obtained in such a manner that the level of the output signal of the line sensor 30 becomes optimum. The optimum exposure measurement is well-known, and thus not described herein.

Figure 6:
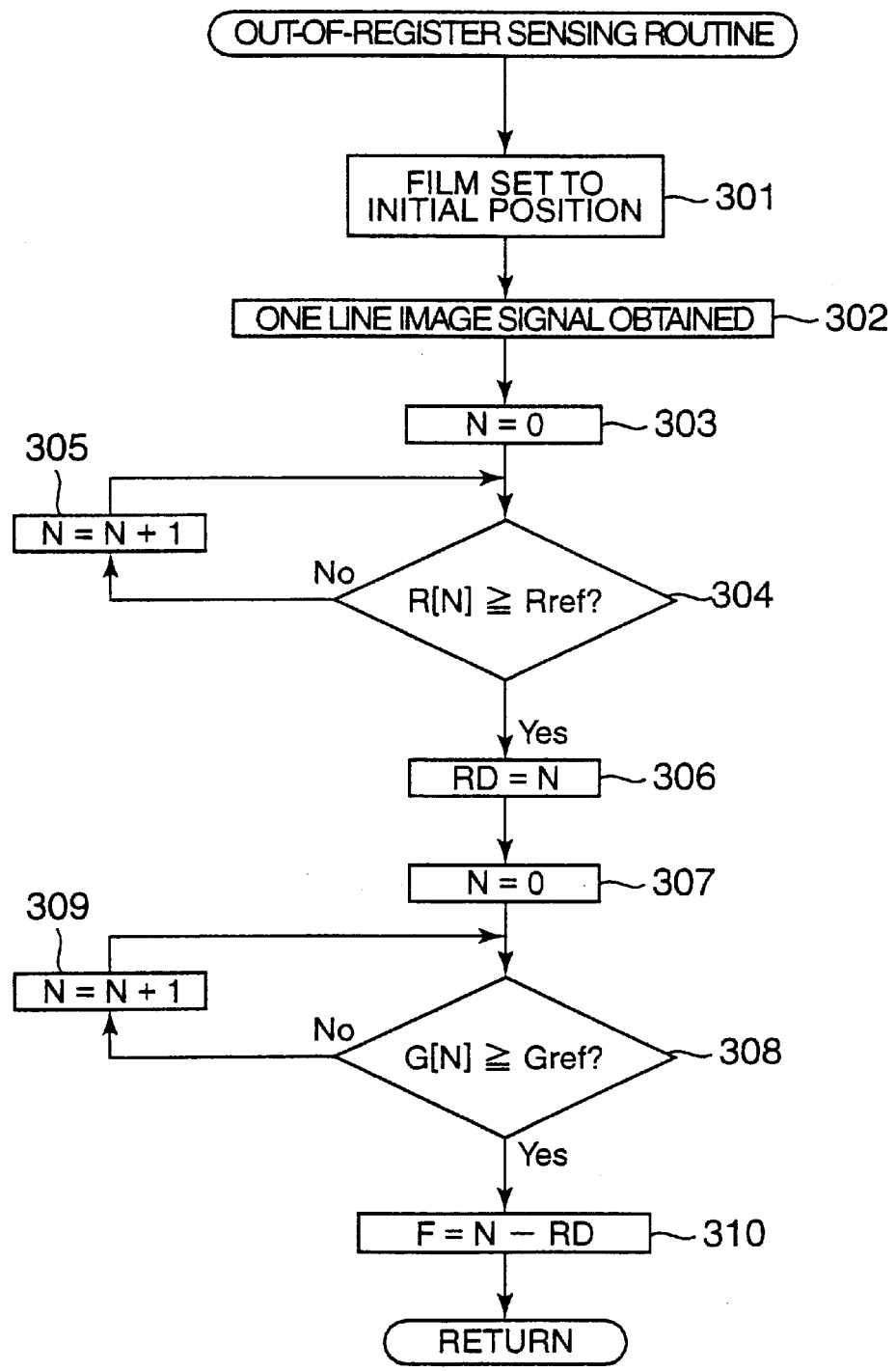
FIG. 6 is a flowchart of an out-of-register sensing routine executed in the first and second embodiments.

In Step 300, an out-of-register detecting routine shown in FIG. 6 is performed. In this routine, the image signals are sensed by the line sensor 30, and a difference between edges (see reference Hd, for example, in FIG. 7) of green and red components of the image signals is obtained, so that out-of-register is sensed, as described later.

In Step 400, a pre-scanning operation is performed in accordance with the optimum exposure time obtained in Step 200. In the pre-scanning operation, the image recorded in the film M is read with a reading pitch, which is coarser than that of the regular scanning operation performed in Step 600. In the pre-scanning operation, the light-emitting diodes 21G, 21R and 21B are illuminated in a predetermined order every time the stage 12 is stopped, so that green, red and blue pixel signals are detected line by line. The pixel signals outputted from the line sensor 30 are transmitted to the computer 60, so that the image is indicated on the surface of the display device.

In Step 500, it is determined whether the regular scanning operation is to be started. When the regular scanning operation is not to be started, Step 450 is executed in which it is determined whether the pre-scanning operation is again to be performed. When the pre-scanning operation is to be carried out again, the process goes back to Step 400, and when the pre-scanning operation is not to be started, the process goes back to Step 500. Conversely, when the regular scanning operation is to be started, Step 600 is performed so that the regular scanning operation is carried out. Namely, the image recorded in the film M is read with a reading pitch which is finer than that of the pre-scanning operation. Then, this routine ends.

Note that, during the execution of this routine, if an interruption process is initiated in accordance with an inputted command to the computer 60, this routine ends, and thus the film M is ejected from the image reading device.

FIG. 6 is a flowchart of the out-of-register sensing routine executed in Step 300 of FIG. 5.

In Step 301, the film M is set to an initial position. Namely, the film M is positioned by moving the stage 12 in such a manner that an end position PS (see FIG. 7) of the film M coincides with the light source 20.

In Step 302, the light-emitting diodes 21G, 21R and 21B are turned ON in a predetermined order, and thus green, red and blue line images corresponding to the position PS are sensed by the line sensor 30, so that pixel signals corresponding to the green, red and blue line images are obtained.

Figure 7:
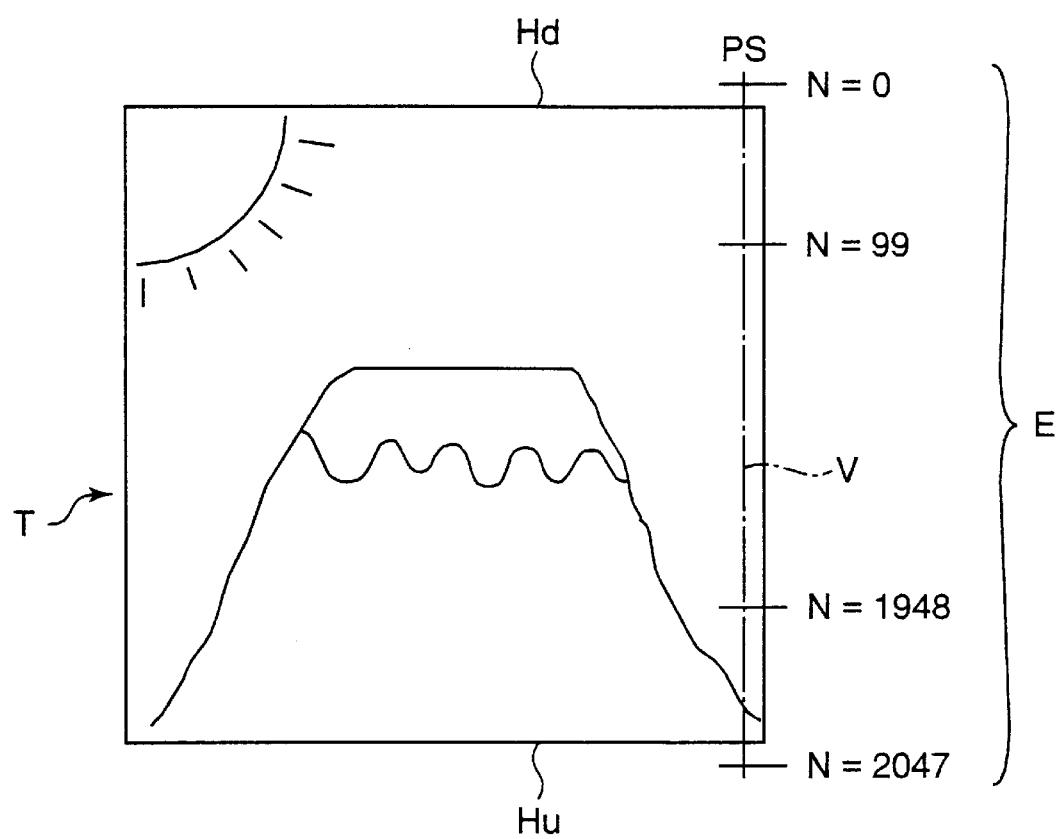
FIG. 7 is a view showing an image recorded in a film.

In Step 303, a parameter N is set to "0". The parameter N corresponds to a position of a pixel included in a vertical line V shown in FIG. 7, the vertical line V corresponding to the longitudinal direction of the line sensor 30. The parameter "0" corresponds to the uppermost position within a reading range E which can be read by the line sensor 30. The reading range E fully covers an image T recorded on the film as shown in FIG. 7.

In Steps 304, 305 and 306, regarding the image T of the red component, an edge Hd or a boundary, between a base film in which the image T is not recorded and a recording area in which the image T is recorded, is sensed.

In Step 304, it is determined whether a pixel signal R(N) of the red component is greater than or equal to a reference value "Rref". When the pixel signal R(N) is less than the reference value "Rref", Step 305 is executed in which the parameter N is increased by 1, and Step 304 is again executed. Conversely, when it is determined in Step 304 that the pixel signal R(N) of the red component is greater than or equal to the reference value "Rref", the process goes to Step 306. In Step 306, the parameter N is set to an edge position RD, which corresponds to a pixel of the edge Hd of the image T of the red component. Namely, when the pixel signal R(N) becomes greater than or equal to the reference value "Rref" due to increment of the parameter N, the pixel corresponding to the parameter N is regarded as being on the edge Hd of the image T.

In Step 307, the parameter N is again set to "0". In Steps 308 and 309, regarding the image T of the green component, the edge Hd is sensed. In Step 308, it is determined whether a pixel signal G(N) of the green component is greater than or equal to a reference value "Gref". When the pixel signal G(N) is less than the reference value "Gref", Step 309 is executed in which the parameter N is increased by 1, and Step 308 is again executed. Conversely, when it is determined in Step 308 that the pixel signal G(N) of the green component is greater than or equal to the reference value "Gref", i.e. when it is determined that the pixel signal G(N) corresponds to a pixel on the edge Hd of the image T of the green component, the process goes to Step 310.

In Step 310, an out-of-register value F is calculated according to equation (1) described below. The out-of-register value F is expressed as a number of pixel signals read from the line sensor 30, since out-of-register occurs in the longitudinal direction of the line sensor 30. Thus, in equation (1), the out-of-register value F is the number of pixel signals corresponding to the amount of offset of the edge Hd of the green component relative to the red component. Namely, the out-of-register value F is calculated by subtracting the edge position RD of the red component from the edge position N of the green component.

$$F = N - RD \quad (1)$$

Thus, the out-of-register sensing routine ends. Note that, if the film M is a negative film, the transmittance of the recording area in which the image T is recorded is lower than that of the base film in which the image T is not recorded. Therefore, in the out-of-register sensing routine, the sign of inequality is reversed in each of Steps 304 and 308.

Figure 8:
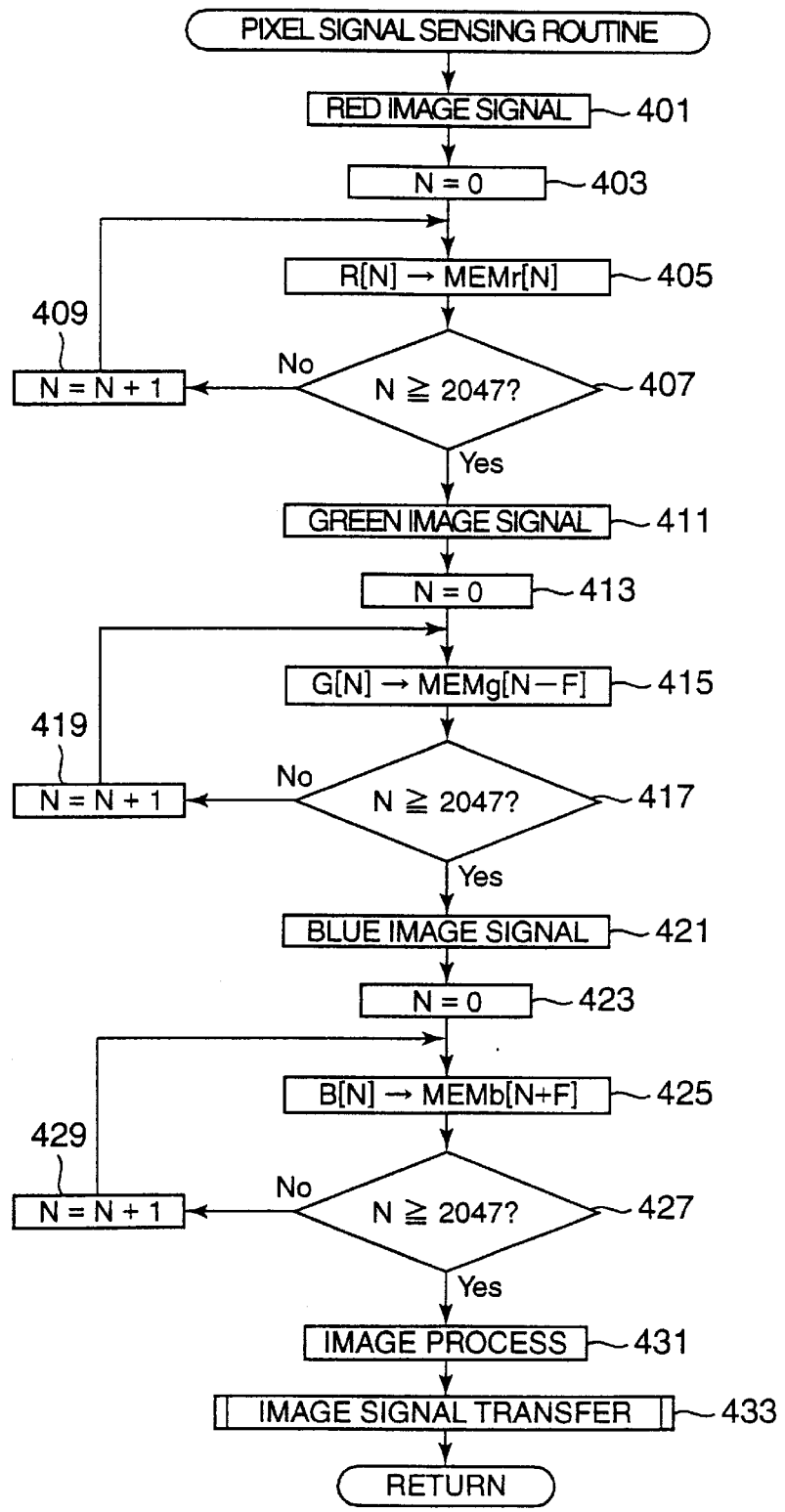
FIG. 8 is a flowchart of a pixel signal sensing routine executed in Steps 400 and 600 of the image reading routine shown in FIG. 5, in the first embodiment.

FIG. 8 is a flowchart of a pixel signal sensing routine executed in Steps 400 and 600 of the image reading routine shown in FIG. 5, in the first embodiment. As will be described below, out-of-register is corrected using the out-of-register value F calculated in the out-of-register sensing routine, so that one line image signal is obtained.

In Step 401, the light-emitting diode 21R of the light source 20 is turned ON, so that an image signal of the red component is sensed by the line sensor 30. In Step 403, a parameter N is set to an initial value "0". The parameter N corresponds to a position of a pixel included in the vertical line V shown in FIG. 7, and the parameter "0" corresponds to the uppermost position within the reading range E. In Step 405, a pixel signal R(N) is stored in an address MEMr(N) of the memory 46. In Step 407, it is determined whether the parameter N is greater than or equal to the end value "2047". As shown in FIG. 7, the end value "2047" corresponds to a position of a pixel located at the lowest position within the reading range E.

When it is determined in Step 407 that the parameter N is less than the end value "2047", Step 409 is executed in which the parameter is incremented by 1, and Step 405 is then executed again. Namely, a pixel signal corresponding to the next pixel of the red component is stored in the memory 46.

Conversely, when it is determined in Step 407 that the parameter N has reached the end value "2047", i.e. when it is determined that all of the pixel signals of the red component of one line image obtained by the line sensor 30 have been stored in the memory 46, the process goes to Step 411.

In Step 411, the light-emitting diode 21G of the light source 20 is turned ON, so that an image signal of the green component is sensed by the line sensor 30. In Step 413, the parameter N is again set to the initial value "0". In Step 415, a pixel signal G(N) is stored in an address MEMg(N−F) of the memory 46. The address MEMg(N−F) is shifted by an amount corresponding to the out-of-register value F from the address MEMg(N), which corresponds to the address MEMr(N) in which the pixel signal of the red component is stored, so that an effect of out-of-register value F is reduced when a color image is reproduced from the pixel signals of the red and green components.

In Step 417, it is determined whether the parameter N is greater than or equal to the end value "2047". When it is determined in Step 417 that the parameter N is less than the end value "2047", the process goes to Step 419 in which the parameter N is incremented by 1, and Step 415 is again executed. Namely, a pixel signal corresponding to the next pixel of the green component is stored in the memory 46.

Conversely, when it is determined in Step 417 that the parameter N has reached the end value "2047", i.e. when it is determined that all of the pixel signals of the green component of one line image obtained by the line sensor 30 have been stored in the memory 46, the process goes to Step 421.

In Step 421, the light-emitting diode 21B of the light source 20 is turned ON, so that an image signal of the blue component is sensed by the line sensor 30. In Step 423, the parameter N is again set to the initial value "0". In Step 425, a pixel signal B(N) is stored in an address MEMb(N+F) of the memory 46. The address MEMb(N+F) is shifted by an amount corresponding to the out-of-register value F from the address MEMb(N), which corresponds to the address MEMr(N) in which the pixel signal of red component is stored, in a direction opposite to that in which the address MEMr(N−F) is shifted, so that an effect of out-of-register is reduced when a color image is reproduced from the pixel signals of the red and blue components. Note that the out-of-register value F of the blue component is equal to that of the green component, since the light-emitting diodes 21B and 21G are separated from the light-emitting diode 21R by the same distance.

In Step 427, it is determined whether the parameter N is greater than or equal to the end value "2047". When it is determined in Step 427 that the parameter N is less than the end value "2047", the process goes to Step 429 in which the parameter N is incremented by 1, and Step 425 is again executed. Namely, a pixel signal corresponding to the next pixel of the blue component is stored in the memory 46.

Conversely, when it is determined in Step 427 that the parameter N is greater than or equal to the end value "2047", i.e. when it is determined that all of the pixel signals of the blue component of one line image obtained by the line sensor 30 have been stored in the memory 46, the process goes to Step 431.

Figure 9:
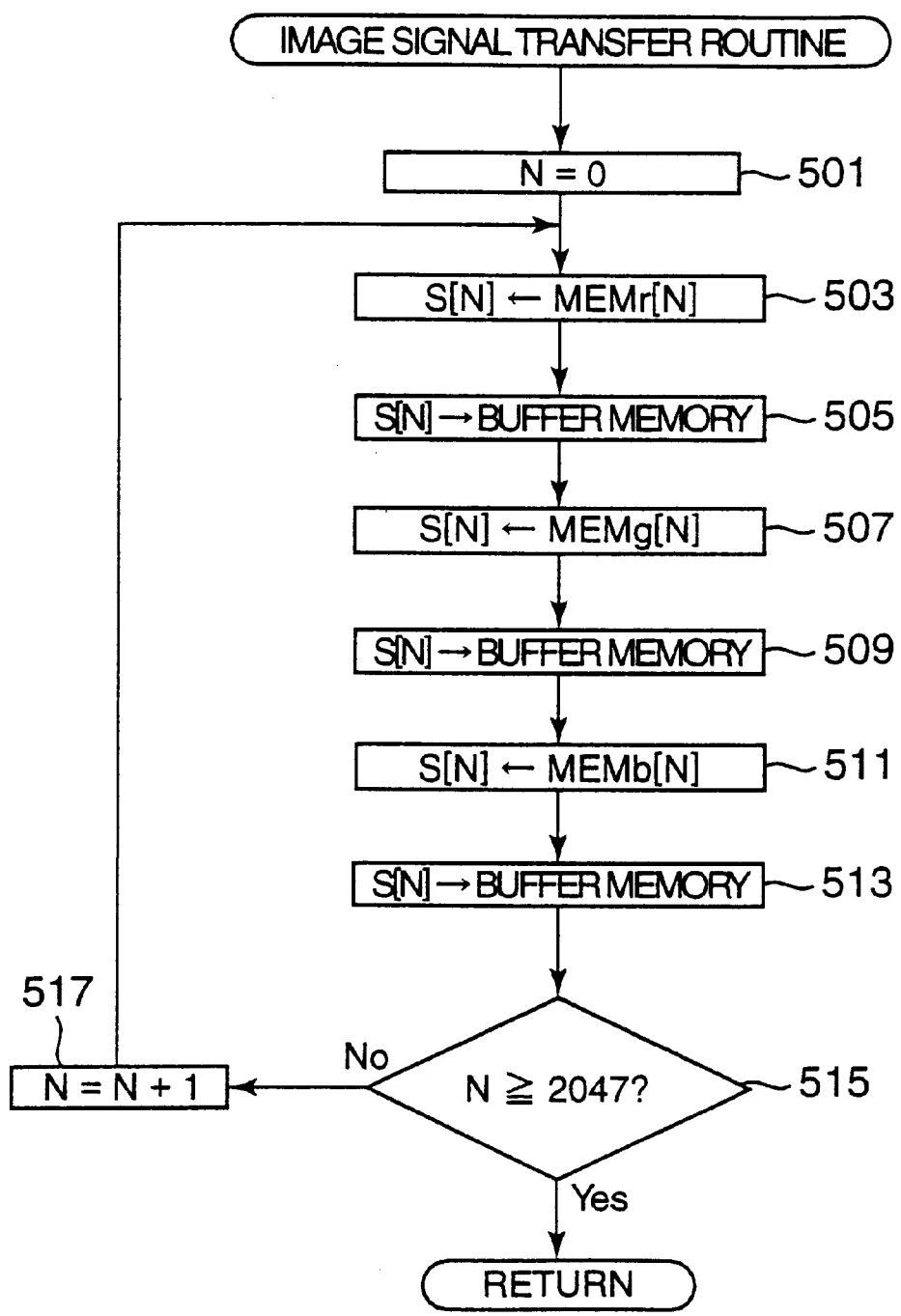
FIG. 9 is a flowchart of an image signal transfer routine executed in Step 433 of the pixel signal sensing routine shown in FIG. 8, in the first embodiment.

In Step 431, the pixel signals of the red and green components stored in the memory 46 are read therefrom, and are again stored in the memory 46 after being subjected to various processes such as a color correction and a gamma correction. In Step 433, an image signal transfer routine, shown in FIG. 9, is executed, so that the pixel signals of the red, green and blue components stored in the memory 46 are transferred to the buffer memory 45a provided in the image processing circuit 45. Thus, the pixel signal sensing routine ends.

FIG. 9 is a flowchart of the image signal transfer routine executed in Step 433 of the pixel signal sensing routine shown in FIG. 8.

In Step 501, a parameter N is set to an initial value "0". The parameter N corresponds to an address of each of the color components in the memory 46. In Step 503, a pixel signal stored in a red component address MEMr(N) of the memory 46 is temporarily stored in a register S(N). The register S(N) has an 8-bit storage capacity and is provided in the image processing circuit 45. In Step 505, the pixel signal of the red component stored in the register S(N) is transferred to the buffer memory 45a provided in the image processing circuit 45.

In Step 507, a pixel signal stored in a green component address MEMg(N) is temporarily stored in the register S(N). In Step 509, the pixel signal stored in the register S(N) is transferred to the buffer memory 45a.

In Step 511, a pixel signal stored in a blue component address MEMb(N) is temporarily stored in the register S(N), and in Step 513, the pixel signal stored in the register S(N) is transferred to the buffer memory 45a.

In Step 515, it is determined whether the parameter N is greater than or equal to the end value "2047". When the parameter N is less than an end value "2047", Step 517 is executed, in which the parameter N is incremented by 1, and Steps 503 through 513 are again executed. Conversely, when it is determined that the parameter N has become the end value "2047", i.e. when the pixel signals of one line image have been transferred to the buffer memory 45a, the image signal transfer routine ends.

As described above, in the first embodiment, the three light-emitting diodes 21G, 21R and 21B are arranged on a straight line, which is perpendicular to the optical axis of the collimator lens 23 and parallel to the longitudinal direction of the line sensor 30. Thus, out-of-register occurs only in the longitudinal direction of the line sensor 30, and the out-of-register value F can be obtained as a number of pixel signals outputted from the line sensor 30.

Therefore, by detecting the edge positions of the images of the red and green components, the out-of-register value F is obtained, and the pixel signals of the green and blue components are stored in addresses of the memory 46, which correspond to pixel positions shifted by the out-of-register value F relative to the pixel positions of the red component. The pixel signals of the green component and the pixel signals of the blue component are shifted in opposite directions to each other, so that out-of-register of the green and blue components relative to the red component is corrected. Thus, an effect of out-of-register on the reproduced color image is reduced.

Figure 10:
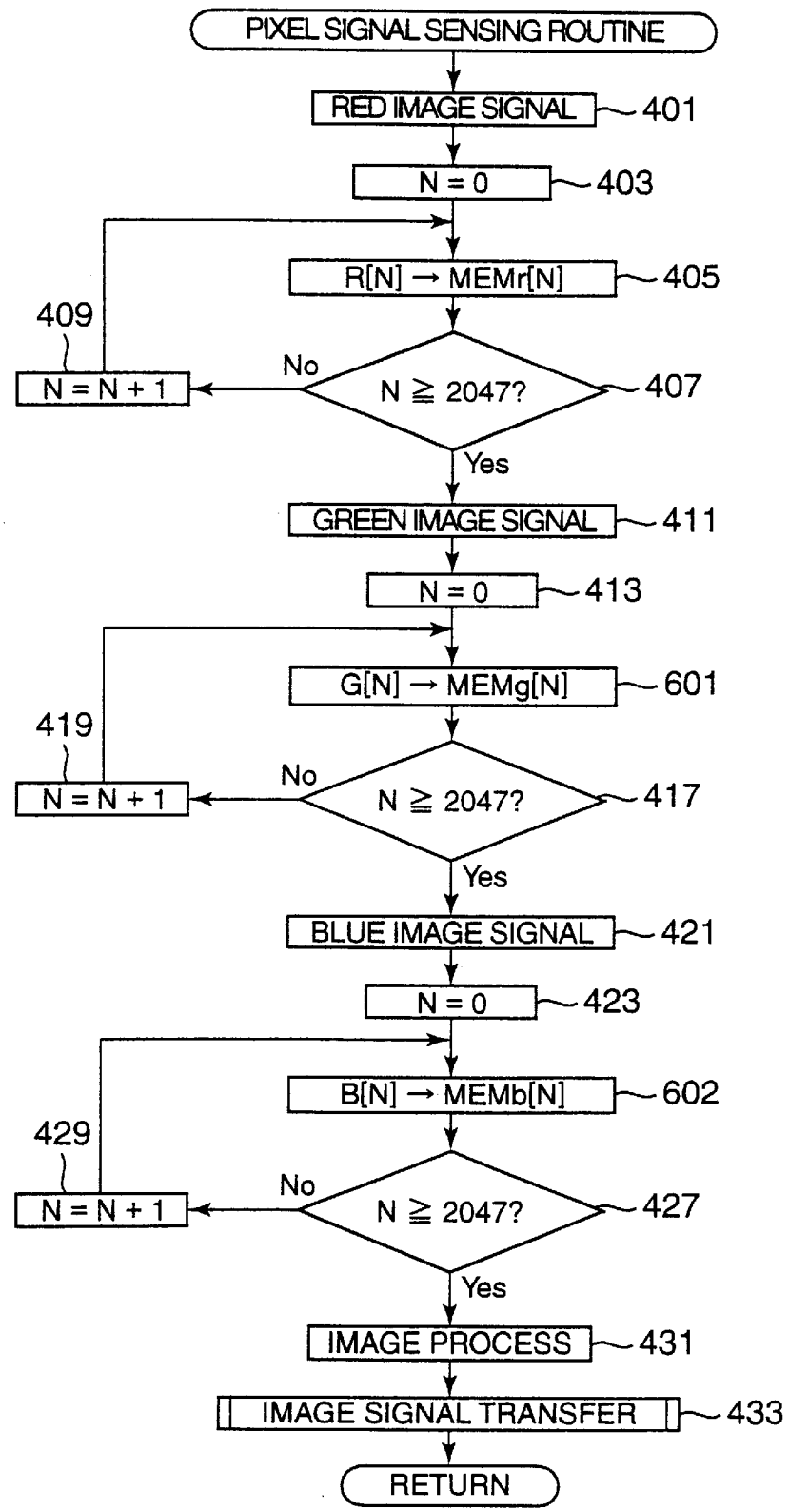
FIG. 10 is a flowchart of the pixel signal sensing routine of the second embodiment.

FIG. 10 is a flowchart of the pixel signal sensing routine of the second embodiment, which is executed in Steps 400 and 600 of the image reading routine shown in FIG. 5. In FIG. 10, identical Steps to those in FIG. 8 are indicated by the same reference numerals. Namely, the differences from FIG. 8 are Steps 601 and 602, which are executed instead of Steps 415 and 425, respectively, and as such only Steps 601 and 602 are described below.

In Step 601, a pixel signal G(N) of the green component outputted from the line sensor 30 is stored in an address MEMg(N) of the memory 46. In Step 602, a pixel signal B(N) of the blue component outputted from the line sensor 30 is stored in an address MEMb(N) of the memory 46. Thus, the shift process by the out-of-register value F is not performed in Steps 601 and 602 as in Steps 415 and 425 in the first embodiment. The other processes are the same as those of FIG. 8.

Figure 11:
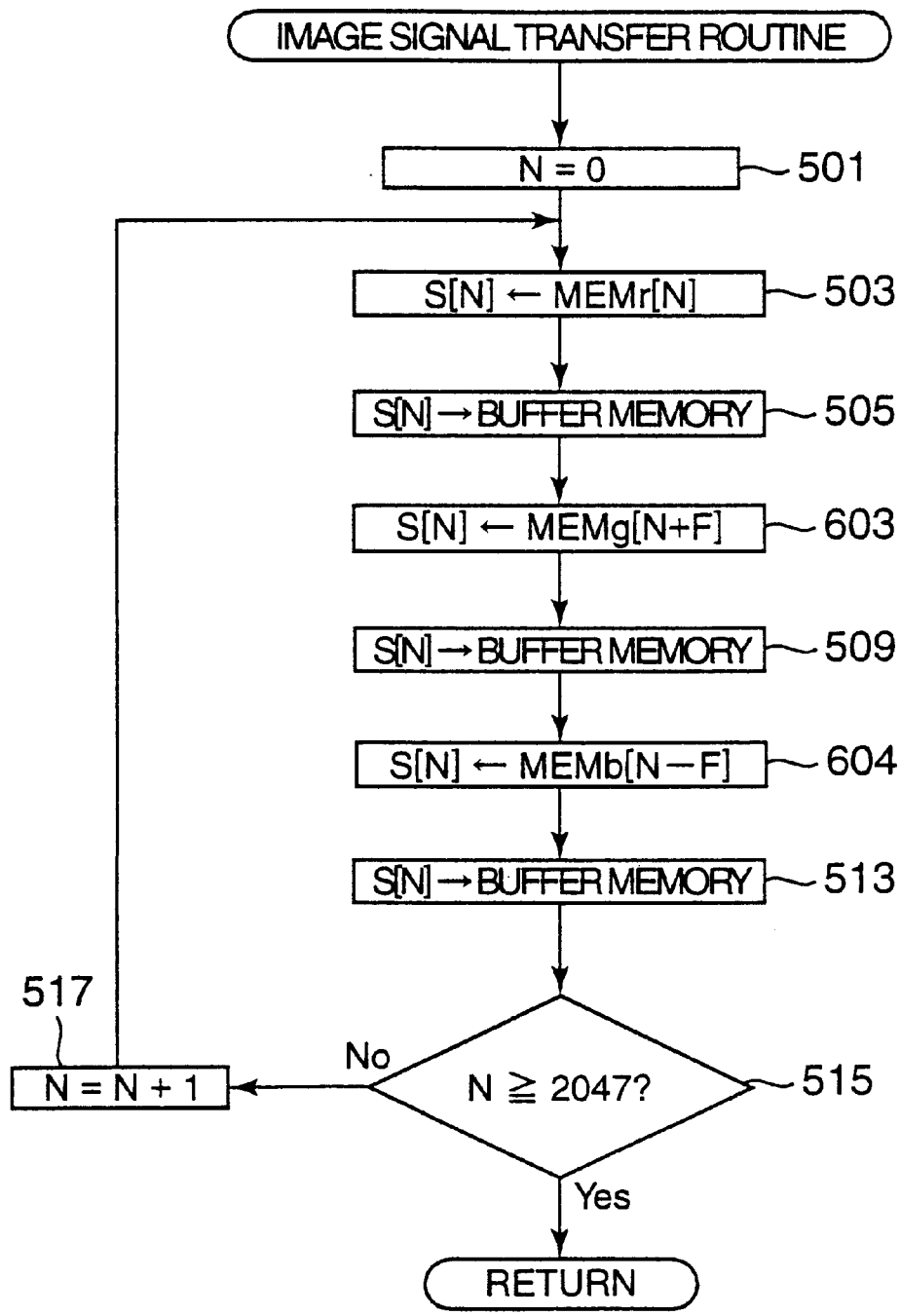
FIG. 11 is a flowchart of the image signal transfer routine of the second embodiment.

FIG. 11 is a flowchart of the image signal transfer routine of the second embodiment, which is executed in Step 433 of the pixel signal sensing routine shown in FIG. 10. In FIG. 11, identical Steps to those in FIG. 9 are indicated by the same reference numerals. Namely, the differences from FIG. 9 are Steps 603 and 604, which are executed instead of Steps 507 and 511, respectively, and as such only Steps 603 and 604 are described below.

In Step 603, a pixel signal of the green component stored in an address MEMg(N+F) of the memory 46 is temporarily stored in the register S(N). Namely, the pixel signal of the green component is stored in an address of the memory 46, the address of which is shifted by the out-of-register value F relative to the corresponding address of the red component. In Step 509, the pixel signal stored in the register S(N) is transferred to the buffer memory 45a.

In Step 604, a pixel signal of the blue component stored in an address MEMb(N−F) of the memory 46 is temporarily stored in the register S(N). Namely, the pixel signal of the blue component is stored in an address of the memory 46, the address of which is shifted in the opposite direction to the green component by the out-of-register value F, relative to the corresponding address of the red component. In Step 513, the pixel signal stored in the register S(N) is transferred to the buffer memory 45a.

As described above, in the second embodiment, the out-of-register value F is obtained by sensing the edge positions of the red and green components in a similar way as the first embodiment. Then, when the pixel signals of the green and blue components are transferred to the buffer memory, a pixel signal corresponding to a pixel position, which is shifted by the out-of-register value F relative to the pixel signal of the red component, is transferred. The pixel signals of the green component and the pixel signals of the blue component are shifted in opposite directions to each other, so that out-of-register of the green and blue components relative to the red component is corrected. Thus, the same effect as the first embodiment is obtained by the second embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-352134 (filed on Dec. 5, 1997) which is expressly incorporated herein, by reference, in its entirety.

What is claimed is:

1. An image reading device comprising:
    a light source that radiates a plurality of light beams of differing color components;
    an optical system that changes said plurality of light beams to a plurality of parallel beams, and leads said plurality of parallel beams to a recording medium, one of said plurality of parallel beams being parallel to an optical axis of said optical system, a remaining beam of said plurality of parallel beams being inclined to said optical axis;
    a line sensor that senses said plurality of parallel beams passing through said recording medium, to generate at least first and second line image signals corresponding to an image recorded on said recording medium, said one of said plurality of parallel beams, which passes through a predetermined point on said recording medium, entering a first portion of a light receiving surface of said line sensor, said remaining beam of said plurality of parallel beams, which passes through said predetermined point, entering a second portion of said light receiving surface;
    an out-of-register sensing processor that senses an amount of out-of-register, being a distance between said first and second portions; and
    an out-of-register adjusting processor that adjusts at least one of said first and second line image signals in such a manner that an effect of said amount of out-of-register on a color image reproduced from said first and second line image signals is reduced.

2. A device according to claim 1, wherein said light source comprises a plurality of said light-emitting elements arranged on a straight line, which passes through a focal point of said optical system and is perpendicular to said optical axis.

3. A device according to claim 2, wherein said line sensor is parallel to said straight line.

4. A device according to claim 1, wherein said first and second portions are offset in a longitudinal direction of said line sensor.

5. A device according to claim 1, wherein said out-of-register sensing processor senses a number of pixel signals, which are read from said line sensor and form said first and second line image signals, said number corresponding to said amount of out-of-register.

6. A device according to claim 1, wherein said out-of-register sensing processor senses said amount of out-of-register of only one of said plurality of parallel beams.

7. A device according to claim 1, wherein said out-of-register adjusting processor adjusts for said amount of out-of-register by using a number of said pixel signals.

8. A device according to claim 1, further comprising a first memory that stores pixel signals generated by said line sensor, and a second memory that stores said pixel signals read from said first memory so that said pixel signals are transferred to an external device provided outside said image reading device.

9. A device according to claim 8, wherein a first address, in which a pixel signal corresponding to said one of said plurality of parallel beams is stored in said first memory, is shifted relative to a second address, in which a pixel signal corresponding to said remaining beam of said plurality of parallel beams is stored in said first memory, by a shifted amount corresponding to said amount of out-of-register.

10. A device according to claim 8, wherein said plurality of parallel beams comprises first, second and third parallel beams, first and second addresses, in which pixel signals corresponding to said first and second parallel beams are stored in said first memory, are shifted in opposite directions relative to a third address, in which a pixel signal corresponding to said third parallel beam is stored in said first memory, by a shifted amount corresponding to said amount of out-of-register.

11. A device according to claim 8, wherein a first address, in which a pixel signal corresponding to said one of said plurality of parallel beams is stored in said second memory, is shifted relative to a second address, in which a pixel signal corresponding to said remaining beam of said plurality of parallel beams is stored in said second memory, by a shifted amount corresponding to said amount of out-of-register.

12. A device according to claim 11, wherein a third address, in which a pixel signal corresponding to said one of said plurality of parallel beams is stored in said first memory, corresponds to a fourth address, in which a pixel signal corresponding to said remaining beam of said plurality of parallel beams is stored in said first memory.

13. A device according to claim 8, wherein said plurality of parallel beams comprises first, second and third parallel beams, first and second addresses, in which pixel signals corresponding to said first and second parallel beams are stored in said second memory, are shifted in opposite directions relative to a third address, in which a pixel signal corresponding to said third parallel beam is stored in said second memory, by a shifted amount corresponding to said amount of out-of-register.

14. A device according to claim 1, wherein said light source includes three light-emitting elements radiating three light beams of differing color components, one of said three light-emitting elements, positioned at the center, is disposed on said optical axis.

15. A device according to claim 14, wherein said one of said three light-emitting elements radiates said one of said plurality of parallel beams.

16. A device according to claim 14, wherein said three light-emitting elements radiate red, green and blue components, respectively.

17. An image reading device comprising:
    means for radiating a plurality of light beams of differing color components;
    means for changing said plurality of light beams to a plurality of parallel beams;
    means for leading said plurality of parallel beams to a recording medium, one of said plurality of parallel beams being parallel to an optical axis of said changing means, a remaining beam of said plurality of parallel beams being inclined to said optical axis;

means for sensing said plurality of parallel beams passing through said recording medium, to generate at least first and second line image signals corresponding to an image recorded on said recording medium, said sensing means including a light receiving surface which said plurality of parallel beams enter, said one of said plurality of parallel beams, which passes through a predetermined point on said recording medium, entering a first portion of said light receiving surface, said remaining beam of said plurality of parallel beams, which passes through said predetermined point, entering a second portion of said light receiving surface;

means for sensing an amount of out-of-register, being a distance between said first and second portions; and means for adjusting at least one of said first and second line image signals in such a manner that an effect of said amount of out-of-register on a color image reproduced from said first and second line image signals is reduced.

* * * * *